United States Patent
Dean

(10) Patent No.: US 8,571,394 B2
(45) Date of Patent: Oct. 29, 2013

(54) METHOD AND APPARATUS FOR CONTROLLING THE POSITION OF AN ELECTRIC MOTOR

(75) Inventor: James J. Dean, Minnesota City, MN (US)

(73) Assignee: Kelsey-Hayes Company, Livonia, MI (US)

( * ) Notice: Subject to any disclaimer, the term of this patent is extended or adjusted under 35 U.S.C. 154(b) by 437 days.

(21) Appl. No.: 13/119,023

(22) PCT Filed: Sep. 14, 2009

(86) PCT No.: PCT/US2009/056831
§ 371 (c)(1),
(2), (4) Date: Mar. 15, 2011

(87) PCT Pub. No.: WO2010/033460
PCT Pub. Date: Mar. 25, 2010

(65) Prior Publication Data
US 2011/0169432 A1 Jul. 14, 2011

Related U.S. Application Data

(60) Provisional application No. 61/097,367, filed on Sep. 16, 2008.

(51) Int. Cl.
*H02P 3/08* (2006.01)
(52) U.S. Cl.
USPC ................ 388/836; 318/245; 318/519
(58) Field of Classification Search
USPC .......... 318/244, 245, 363, 519; 388/835, 836
See application file for complete search history.

(56) References Cited

U.S. PATENT DOCUMENTS

| 4,473,786 A | 9/1984 | Miyashita et al. | |
|---|---|---|---|
| 4,558,265 A | 12/1985 | Hayashida et al. | |
| 4,760,318 A * | 7/1988 | Jones | 318/362 |
| 5,331,262 A | 7/1994 | Francisco | |
| 6,013,996 A | 1/2000 | Howard et al. | |
| 6,417,595 B1 | 7/2002 | Wasson | |
| 6,686,716 B1 | 2/2004 | Predina et al. | |
| 6,936,989 B2 | 8/2005 | Hogan | |
| 2008/0298784 A1 * | 12/2008 | Kastner | 388/811 |

FOREIGN PATENT DOCUMENTS

| DE | 689 02 664 | 9/1992 |
|---|---|---|
| DE | 100 28 037 | 12/2001 |
| DE | 10 2004 061 917 | 7/2006 |

(Continued)

OTHER PUBLICATIONS

The German Examination Report dated Jul. 25, 2012.

*Primary Examiner* — Bentsu Ro
(74) *Attorney, Agent, or Firm* — Tarolli, Sundheim, Covell & Tummino LLP

(57) ABSTRACT

A method is provided for controlling a position of an electric dc brush motor (22, 24) including the steps of supplying drive current (104) to drive the electric motor and calculating (70, 108) a coast constant for the motor. Current through the motor is monitored (80) and motor speed (66) is determined in response to monitored motor current. Electrical current to the motor is interrupted (50) in response to the calculated coast constant (70, 106) and motor speed when it is desired to stop the electric motor so that a brush of the motor will come to rest at a location on a commutator segment of the motor (22, 24).

5 Claims, 2 Drawing Sheets

(56) References Cited

FOREIGN PATENT DOCUMENTS

| | | |
|---|---|---|
| EP | 0 087 190 A1 | 8/1983 |
| JP | 06-343285 A | 12/1994 |
| JP | 08-009680 A | 1/1996 |
| JP | 2003-153571 A | 5/2003 |
| JP | 2004-297861 A | 10/2004 |
| JP | 2005-328972 A | 12/2005 |
| KR | 20-2000-0015041 U | 7/2000 |

\* cited by examiner

METHOD AND APPARATUS FOR CONTROLLING THE POSITION OF AN ELECTRIC MOTOR

RELATED APPLICATION

This application claims priority from U.S. Provisional Patent Application Ser. No. 61/097,367, filed Sep. 16, 2008, the subject matter of which is incorporated herein by reference in its entirety.

FIELD OF THE INVENTION

The present invention is directed to electric motors and is more particularly directed to a method and apparatus for controlling the position of an electric motor.

BACKGROUND OF THE INVENTION

Electric motors are often used to drive a work piece. When the motor is stopped, there is a chance that a contact brush of the motor will land very near the boundary between one of the motor's commutator segments. Typically, a count of drive pulse signals applied to the motor is used to determine the motor position and, in turn, the position of the work piece. If the motor contact brush is between commutator segments, the count of the next drive pulse provided to drive the motor may not be accurate in determining motor position. If a drive is inaccurate because of a near brush/boundary condition, the resulting position count will be off by one for that drive. The count errors can accumulate over time which will cause inaccuracy in positioning of the work piece.

SUMMARY OF THE INVENTION

This invention uses the known characteristics of the motor to predict how far the motor will coast when turned off. In accordance with the present invention, the motor is turned off at a time that will result in the motor stopping with a commutator brush near the middle of a commutator segment, thus avoiding the segment brush/boundary problem that could possibly result in an inaccuracy of a position determination.

In accordance with one example embodiment of the present invention, a method is provided for controlling a position of an electric dc brush motor including the steps of supplying drive current to drive the electric motor and calculating a coast constant for the motor. Current through the motor is monitored and motor speed is determined in response to monitored motor current. Electrical current to the motor is interrupted in response to the calculated coast constant and the determined motor speed when it is desired to stop the electric motor so that a brush of the motor will come to rest at a location on a commutator segment of the motor.

In accordance with another example embodiment of the present invention, an apparatus is provided for controlling a position of an electric dc brush motor comprising an electrical supply source for supplying drive current to drive the electric motor and means for calculating a coast constant for the motor. A current monitor monitors current through the motor and means determines motor speed in response to monitored motor current. An interrupter interrupts the electrical current to the motor in response to the calculated coast constant, and the determined motor speed when it is desired to stop the electric motor so that a brush of the motor will come to rest at a location on a commutator segment of the motor.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
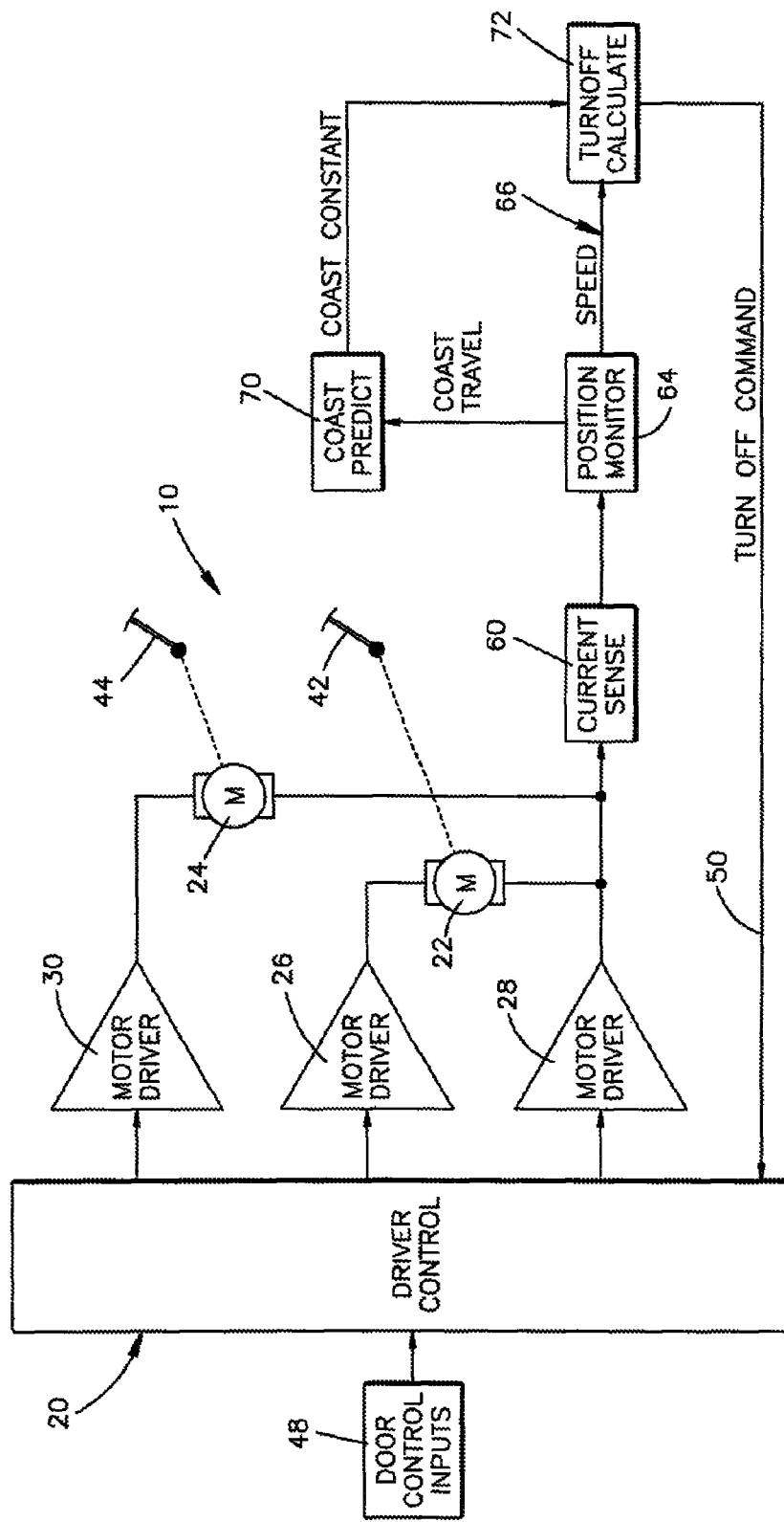
FIG. 1 is a schematic block diagram of a motor drive circuit having a precision motor stop feature in accordance with one example embodiment of the present invention.

Referring to FIG. 1, a motor drive circuit 10, having a precision motor stop feature, in accordance with one example embodiment of the present invention, is shown. The motor drive circuit 10 includes a drive control 20 coupled to one or more motors 22, 24 through motor drive circuits 26, 28, 30. By way of example, the motors 22, 24 may be used in a vehicle climate control system to control the position of climate control doors 42, 44, respectively, that, in turn, control the air flow into the cabin of the vehicle. The motors 22, 24 can be dc brush-type motors. The armature of the dc motors are connected to actuator members (not shown) through associated gear mechanism (not shown) so that actuation of the motors 22, 24 causes an associated movement of the doors 42, 44, respectively.

The motor drivers 26, 28, 30 may take the form of application specific integrated circuits ("ASICs") each including field effect transistors ("FETs") that are associated with each dc motor that are driven by the ASICs. When a dc voltage is supplied to one of the dc motors 22, 24 in a first direction, the motor and its associated door is driven in a first direction. When a dc voltage is supplied to one of the dc motors 22, 24 in a second direction, the motor and its associated door is driven in a second or opposite direction.

A drive control 20 commands the door movement in response to door control inputs 48 and turns off the drive command in response to a drive command signal 50. The various door control inputs 48 to the control 20 may include external temperature, radiant temperature, evaporator temperature, air flow, and/or others. In controlling the positioning the doors 42, 44 to their desired positions, the control 20 provides drive commands for driving the dc motors 22, 24. For example, the control may provide the command to move one door by 256 pulses in one direction. To drive the dc motor, the first associated FET of the ASIC provides a constant dc voltage to the associated dc motor and the second associated FET is connected to ground. The constant dc voltage is supplied to the dc motor continuously so that the armature rotates continuously from its starting position to its ending position, which positions the door to its desired position. To stop rotation of the armature of the dc motor, the first and second associated FETs are connected to the same potential.

As the motors 22, 24 rotate, current pulses are occurring. The current through the motors are sensed by a current sensor 60. Each pulse results from a monitored current discontinuity. Current discontinuities result from a brush of the dc motor moving from one commutator segment to an adjacent commutator segment. For example, when the dc motor includes an armature having three commutator segments and two brushes, one complete rotation of the armature results in six current discontinuities. The current sensor is connected to the dc motor via the first and second associated FETs so that the current sensor still senses current discontinuities even when the first and second FETs are grounded. Thus, the ASIC of the system is constantly monitoring for current discontinuities.

Based on the number of current pulses monitored, the position of the motors, 22, 24, and, in turn, the positions of the doors 42, 44, respectively, are monitored in monitor 64. One skilled in the art will appreciate that the position monitor may be part of control 20 and all may be part of a microcontroller. Once the motors' position are known, the speeds of the motors are known and speed signals 66 are provided. The control 20 also includes software for counting the number of received pulses and for determining the actual position of the doors 42, 44 from the determined count. The control 20 includes a non-volatile memory in which position information of the doors are stored.

It is necessary to predict the coast of the motor. The position of the damper doors, i.e., the rotary position of the motor output shaft, is determined by counting drive pulses and referencing from an initial zero position of the motor and knowing the angle of movement of the drive shaft of the motor corresponding to each drive pulse received. However, a position error can occur when determining the motor position due to uncertainty at the end of the drive, i.e., when the drive signal is turned off and motor coast occurs. This occurs due to inertia coasting of the motor due to the motor itself and inertia of the system. Also, the commutator brush can stop between two commutator segment locations so that the first drive pulse applied at startup is counted but does not result in actual movement of the motor. Also, a final pulse applied to a motor may be missed if the current is too low for detection when the motor coasts to a stop. Also, the motor may back up due to cogging forces and the back-up pulse be counted as another forward pulse. These errors are avoided by the present invention by stopping the motor brushes midway between segment boundaries, i.e., making sure the brush is in the middle of a commutator contact. The prediction process and turnoff calculation are shown as elements 70, 72. The result is the turn off command 50 at the correct time to place the brush in the middle of the commutator segment. The relevant equations for the motor are:

$$T = K \cdot i$$

$$E = K \cdot \theta$$

$$J \cdot \theta'' + b \cdot \theta' = K \cdot I \quad (1)$$

$$L \frac{d}{dt} i + R \cdot i = V - K \cdot \theta' \quad (2)$$

Where:
T—torque
E—back-emf of motor
K—electromotive force constant
i—motor current
b—damping ratio
R—electrical resistance
J—inertia
L—inductance
V—applied voltage
θ—position of the output shaft
θ'—motor speed
θ"—motor acceleration What we want to know is for any given i, how large is θ from when the applied voltage is removed to when it stops (θ'=θ"=0).

Stated differently:

$$\lim_{t \to \infty} \theta(t) \quad V = \begin{vmatrix} V_{ign} & \text{if } t < 0 \\ 0 & \text{otherwise} \end{vmatrix}$$

$$J \cdot \theta'' + b \cdot \theta' = K \cdot I \quad (1)$$

$$L \cdot \frac{d}{dt} i + R \cdot i = V - K \cdot \theta' \quad (2)$$

$$\text{Laplace}(\theta'') = (s^2)\Theta(s) - s \cdot \theta(t_0) - \theta'(t_0)$$

Calculate the Laplace transforms of the differentials.

$$\text{laplace }(\theta') = s \cdot \Theta(s) - \theta(t_0)$$

$$\text{laplace }(i') = s \cdot I(s) - i(t_0)$$

$i(t_0) := i_0$ Initial current at turn off $\theta(t_0) := 0$ Initial position set to zero $\theta'(t_0) := \omega_0$ Initial speed at turn off So the Laplace transforms become:

$$\text{laplace }(\theta'') = (s^2)\Theta(s) - \omega_0$$

$$\text{laplace }(\theta') = s \cdot \Theta(s)$$

$$\text{laplace }(i') = s \cdot I(s) - i_0$$

Change variables so MathCAD can handle the symbolic math:

$$I = I(s) \quad \text{Laplace }(\theta'') = (s^2)Q - \omega_0$$

$$\text{Laplace }(\theta') = s \cdot Q$$

$$Q = \Theta(s) \quad \text{Laplace }(I') = s \cdot I - i_0$$

Take the Laplace transform of equation 1.

$$J \cdot \text{Laplace }(\theta'') + b \cdot \text{Laplace }(\theta') = K \cdot I(s)$$

$$J \cdot [(s^2) \cdot Q - \omega_0] + b \cdot (s \cdot Q) = K \cdot I$$

Take the Laplace transform of equation 2.

$$L \cdot \text{laplace }(i') + R \cdot I(s) = V - K \cdot \text{laplace }(\theta')$$

If V is zero when motor is turned off, we can expand the rest.

$$L \cdot \text{laplace }(i') + R \cdot I(s) = -K \cdot \text{laplace }(\theta')$$

$$L \cdot (s \cdot I - i_0) + R \cdot I = -K \cdot (s \cdot Q)$$

Solving both equations 3 and 4 for I and setting them equal to each other.

$$\frac{-(-L \cdot i_0 + K \cdot s \cdot Q)}{L \cdot s + R} = \frac{J \cdot s^2 \cdot Q - J \cdot \omega_0 + b \cdot s \cdot Q}{K}$$

We solve for θ (s) {Q}.

$$Q = \frac{L \cdot i_0 \cdot K + J \cdot \omega_0 \cdot L \cdot s + J \cdot \omega_0 \cdot R}{s \cdot (K^2 + J \cdot s^2 \cdot L + J \cdot s \cdot R + b \cdot L \cdot s + b \cdot R)}$$

Factoring and solving using partial fractions.

$$\frac{L \cdot i_0 \cdot K + J \cdot \omega_0 \cdot L \cdot s + J \cdot \omega_0 \cdot R}{s \cdot (K^2 + J \cdot s^2 \cdot L + J \cdot s \cdot R + b \cdot L \cdot s + b \cdot R)}$$

Partial fraction expansion:

$$\frac{L \cdot i_0 \cdot K + J \cdot \omega_0 \cdot R}{(K^2 + b \cdot R) \cdot s} - \frac{J \cdot R \cdot L \cdot i_0 \cdot K + J^2 \cdot R^2 \cdot \omega_0 + b \cdot L^2 \cdot i_0 \cdot K - J \cdot \omega_0 \cdot L \cdot K^2 + s \cdot J \cdot L^2 \cdot i_0 \cdot K + s \cdot J^2 \cdot L \cdot \omega_0 \cdot R}{(K^2 + b \cdot R) \cdot (K^2 + J \cdot s^2 \cdot L + J \cdot s \cdot R + b \cdot L \cdot s + b \cdot R)}$$

Take the inverse Laplace transform we get the solution for position.

$$\frac{L \cdot i_0 \cdot K + J \cdot \omega_0 \cdot R}{(K^2 + b \cdot R) \cdot s} \;\Big|\; \begin{array}{l} invlaplace, s \\ t \end{array} \to \frac{J \cdot R \cdot \omega_0 + K \cdot L \cdot i_0}{K^2 + R \cdot b} \quad \text{For the first term}$$

$$\frac{L \cdot i_0 \cdot K + J \cdot \omega_0 \cdot R}{(K^2 + b \cdot R) \cdot s} - \frac{J \cdot R \cdot L \cdot i_0 \cdot K + J^2 \cdot R^2 \cdot \omega_0 + b \cdot L^2 \cdot i_0 \cdot K - J \cdot \omega_0 \cdot L \cdot K^2 + s \cdot J \cdot L^2 \cdot i_0 \cdot K + s \cdot J^2 \cdot L \cdot \omega_0 \cdot R}{(K^2 + b \cdot R) \cdot (K^2 + J \cdot s^2 \cdot L + J \cdot s \cdot R + b \cdot L \cdot s + b \cdot R)} \;\Big|\; \begin{array}{l} invlaplace, s \\ t \end{array} \to$$

$$\frac{J \cdot R \cdot \omega_0 + K \cdot L \cdot i_0}{K^2 + R \cdot b} - \frac{e^{-\frac{t(j \cdot R + l \cdot b)}{2j \cdot L}} \left[ \cosh\left(\frac{t \cdot \sqrt{\frac{J^2 \cdot R^2 - 4 \cdot j \cdot K^2 \cdot L - 2 \cdot J \cdot L \cdot R \cdot b \cdot L^2 \cdot b^2}{J^2 \cdot L^2}}}{2}\right) \cdot (J \cdot R \cdot \omega_0 + K \cdot L \cdot i_0) + \sinh\left(\frac{t \cdot \sqrt{\frac{J^2 \cdot R^2 - 4 \cdot j \cdot K^2 \cdot L - 2 \cdot J \cdot L \cdot R \cdot b \cdot L^2 \cdot b^2}{J^2 \cdot L^2}}}{2}\right) \cdot \frac{(\omega_0 \cdot J^2 \cdot R^2 - 2 \cdot \omega_0 \cdot J \cdot K^2 \cdot L + i_0 \cdot J \cdot K \cdot L \cdot R - b \cdot \omega_0 \cdot J \cdot L \cdot R + b \cdot i_0 \cdot K \cdot L^2)}{J \cdot L \cdot \frac{(J \cdot R \cdot \omega_0 + K \cdot L \cdot i_0)}\sqrt{\frac{J^2 \cdot R^2 - 4 \cdot J \cdot K^2 \cdot L - 2 \cdot J \cdot L \cdot R \cdot b + L^2 \cdot b^2}{J^2 \cdot L^2}}} \right]}{K^2 + R \cdot b}$$

Note that the inverse transform for the second fraction of the equation has an e with a negative exponent in all the terms. So, as we take t to infinity, this goes to zero, effectively removing this term. So the solution becomes:

$$\theta_{coast} \frac{L \cdot i_0 K + J \cdot \omega_0 R}{K^2 + b \cdot R} \quad (5)$$

L, K and R are known at design time as soon as the motors to be used are selected.

i0 and w0 are measured values at run time.
b and J are unknowns and must be calculated or optimized out.

Determination of b

Forces acting on a motor when driving:
Applied power
External loading (ram air, unit assembly kinematics)
Resistance to motion (friction, b)

When the motor is at steady state, the current (i) drawn by the motor is the amount required to overcome the external forces it is experiencing. At a steady state condition, inertia is not a factor. So equation 1 reduces to:

$$b \cdot \theta' = K \cdot i$$

Motor speed ($\theta'$), current (i) and motor constant (K) are known, so the damping ratio (b) can be calculated.

To determine the value of J, it is assumed that when stopping a motor, energy may be stored in the rotating elements (inertia, J). This inertia is reflected back to the motor, but is reduced by the gear train. So the amount of inertia due to the external system is small compared to the inertia of the motor itself. This is due to the fact that the doors have little mass. J can be characterized for each motor.

The goal is to turn off the motor drive at such a time that the motor will coast to a stop at the exact desired motor position. With equation (5), we have enough information to calculate when to turn the drive off. The choice of time rather than position as the control variable is due to the fact that the motor position is only known at discrete points, i.e. every time a pulse occurs. This may not give enough resolution to be able to accurately achieve the final motor position.

Starting from predetermined position 0 (we want to move to the desired target position+half a pulse ($\theta_{target}+\frac{1}{2}$ pulse). Every time a pulse is received, the current position ($\theta_{current}$) is known. So the distance still required to move before turning off the drive can be calculated ($\theta_{tillturnoff}$).

$$\theta_{tillturnoff} = \theta_{target} + \theta_{0.5pulse} - \theta_{current} - \theta_{coast}$$

At steady state:

$$\omega = \frac{\theta_{tillturnoff}}{t_{tillturnoff}} \text{ and } \omega = \omega_0$$

$$t_{tillturnoff} = \frac{\theta_{target} + \theta_{0.5pulse} - \theta_{current} - \theta_{coast}}{\omega_0}$$

$$t_{tillturnoff} = \frac{\theta_{target} + \theta_{0.5pulse} - \theta_{current} - \frac{L \cdot i_0 \cdot K + J \cdot \omega_0 \cdot R}{K^2 + b \cdot R}}{\omega_0}$$

*subst* coast

If we assume that Li0K<<<Jw0R, then the equation can be rewritten:

$$t_{tillturnoff} = \frac{\theta_{target} + \theta_{0.5pulse} - \theta_{current} - \frac{J \cdot \omega_0 \cdot R}{K^2 + b \cdot R}}{\omega_0}$$

$$t_{tillturnoff} = \frac{\theta_{target} + \theta_{0.5pulse} - \theta_{current}}{\omega_0} - \frac{\frac{J \cdot \omega_0 \cdot R}{K^2 + b \cdot R}}{\omega_0} \text{ distribute } w0$$

$$t_{tillturnoff} = \frac{\theta_{target} + \theta_{0.5pulse} - \theta_{current}}{\omega_0} - \frac{J \cdot R}{K^2 + b \cdot R} \text{ simplify } w0 \text{ in second term}$$

Working with distance in units of pulses, if D is the target number of pulses and P is the current number of pulses traveled, then:

$$t_{tillturnoff} = \frac{D - 1 + \frac{1}{2} - (P - 1)}{\frac{1}{t_e \cdot T}} - \frac{J \cdot R}{K^2 + b \cdot R} \quad (6)$$

where $w0$ is distance/time elapsed and $t_e$ is time elapsed in tics and $T$ is sample time $$t_{tillturnoff} = \left(D + \frac{1}{2} - P\right) \cdot t_e \cdot T - \frac{J \cdot R}{K^2 + b \cdot R}$$

Equation (6) is accurate if b is known, but if it must be calculated, then further calculation is required. This is only valid if at steady state, i.e. $\theta''=0$.

$$t_{tillturnoff} = \left(D + \frac{1}{2} - P\right) \cdot t_e \cdot T - \frac{J \cdot R}{K^2 + \frac{K \cdot i_0}{\frac{3}{t_e \cdot T}} \cdot R}$$

where $b = \frac{K \cdot i_0}{\omega_0}$ and $\omega_0 = \frac{\frac{\pi}{3}}{t_e \cdot T}$ $$t_{tillturnoff} = \left(D + \frac{1}{2} - P\right) \cdot t_e \cdot T - \frac{J \cdot R}{K^2 + 3 \cdot K \cdot \frac{i_0}{\pi} \cdot t_e \cdot T \cdot R}$$

simplify second term

To make runtime calculations faster, we reduce the number of operations that must be done at runtime by rearranging the equation to minimize runtime multiplies and divides.

$$t_{tillturnoff} = \left[\left(D + \frac{1}{2} - P\right) \cdot t_e - \frac{J \cdot R}{K^2 \cdot T + \frac{3}{\pi} \cdot K \cdot i_0 \cdot t_e \cdot T^2 \cdot R}\right] \cdot T$$

factor out $T$ $$\frac{t_{tillturnoff}}{T} = \left[\left(D + \frac{1}{2} - P\right) \cdot t_e - \frac{J \cdot R}{K^2 \cdot T + \frac{3}{\pi} \cdot K \cdot i_0 \cdot t_e \cdot T^2 \cdot R}\right]$$

put time in tics instead of seconds

Constants are selected that can be pre-calculated.

$$B = J \cdot R \quad C = K^2 \cdot T \quad D = \frac{3}{\pi} \cdot K \cdot T^2 \cdot R$$

New equation is:

$$\frac{t_{tillturnoff}}{T} = \left[\left(D + \frac{1}{2} - P\right) \cdot t_e - \frac{B}{C + D \cdot i_0 \cdot t_e}\right] \quad (7)$$

The above-calculations require knowledge of the coefficients of the motor that can vary over production lots and time. A different method can be used in accordance with the present invention to estimate a combined factor based on the coasting behavior of previous drives.

The total target position equation is:

$$\theta_{target} = (P_t - 1) \cdot \frac{pi}{3} + \frac{pi}{6}$$

where $P_t$ is total pulses in the drive $pi/3 = 1$ pulse travel in radians $$(P_t - 1) \cdot \frac{pi}{3} + \frac{pi}{6} = (P_{current} - 1) \cdot \frac{pi}{3} + \theta_{bto} + \theta_{coast}$$

where $\theta_{bto}$ is distance traveled between last driving pulse and where $$(P_t - 1) \cdot \frac{pi}{3} + \frac{pi}{6} = (P_{current} - 1) \cdot \frac{pi}{3} + \theta_{bto} + \frac{L \cdot i_0 \cdot K + J \cdot \omega_0 \cdot R}{K^2 + b \cdot R}$$

*Subst eq 5*

If we ASSUME that $LiOK<<<JwOR$, then the equation can be rewritten:

$$(P_t - 1) \cdot \frac{pi}{3} + \frac{pi}{6} = (P_{current} - 1) \cdot \frac{pi}{3} + \theta_{bto} + \frac{J \cdot \omega_0 \cdot R}{K^2 + b \cdot R}$$

If we now assume that the motor constants do not change much from one drive to another and lump them all into one coefficient, C.

$$(P_t - 1) \cdot \frac{pi}{3} + \frac{pi}{6} = (P_{current} - 1) \cdot \frac{pi}{3} + \theta_{bto} + C \cdot \omega_0$$

$$(P_t - 1) \cdot \frac{pi}{3} + \frac{pi}{6} = (P_{current} - 1) \cdot \frac{pi}{3} + t_{bto} \cdot \omega_0 + C \cdot \omega_0$$

$subst \ \omega_0 = \frac{\theta_{bto}}{t_{bto}}$ $$(P_t - 1) \cdot \frac{pi}{3} + \frac{pi}{6} = (P_{current} - 1) \cdot \frac{pi}{3} + t_{bto} \cdot \frac{\frac{pi}{3}}{t_e} + C \cdot \frac{\frac{pi}{3}}{t_e}$$

$subst \ \omega_0 = \frac{\frac{pi}{3}}{t_e}$ $$(P_t - 1) \cdot \frac{1}{2} = (P_{current} - 1) + t_{bto} \cdot \frac{1}{t_e} + C \cdot \frac{1}{t_e}$$

eliminate $pi/3$ $$\left[(P_t) + \frac{1}{2} - (P_{current})\right] \cdot t_e = t_{bto} + C \quad (8)$$

multiply by $1/t_e$ and simplify $$t_{bto} = \left(P_t + \frac{1}{2} - P_{current}\right) \cdot t_e - C \quad (9)$$

Solve for $t_{bto}$.
This will be used to predict when to turn off the motor.

To get the value of C, form the equation for an uncontrolled coast.

$$C \cdot \omega_0 = \theta_{tfp} + (P_{coast} - 1) \cdot \frac{pi}{3} + \theta_{alp}$$

$\theta_{tfp}$ distance from turnoff to first coast pulse $\theta_{alp}$ distance from last coast pulse to actual stopping point $$C \cdot \omega_0 = \frac{pi}{3} - \omega_0 \cdot t_{bto} + (P_{coast} - 1) \cdot \frac{pi}{3} + \theta_{alp}$$

$t_{bto}$ time from last driving pulse to turn off $$C = \frac{\left[\frac{pi}{3} - \omega_0 \cdot t_{bto} + (P_{coast} - 1) \cdot \frac{pi}{3} + \theta_{alp}\right]}{\omega_0}$$

$$C = 3 \cdot \frac{\frac{1}{3} \cdot pi - \frac{1}{3} \cdot \frac{pi}{t_e} \cdot t_{bto} + \frac{1}{3} \cdot (P_{coast} - 1) \cdot pi + \theta_{alp}}{pi} \cdot t_e$$

$subst \ \omega_0 = \frac{\frac{pi}{3}}{t_e}$ $$C = t_e - t_{bto} + t_e \cdot (P_{coast} - 1) + \frac{3 \cdot \theta_{alp} \cdot t_e}{pi}$$

The last term is the uncertainty in the estimation of C. The range of the last term must be between 0 and 1 pulses, so a min and max for C can be calculated.

$$C_{max} = t_e - t_{bto} + t_e \cdot (P_{coast} - 1) + \frac{pi}{3} \cdot \frac{3}{pi} \cdot t_e$$

$$C_{max} = t_e - t_{bto} + t_e \cdot P_{coast}$$

$$C_{min} = t_e - t_{bto} + t_e \cdot (P_{coast} - 1)$$

Figure 2:
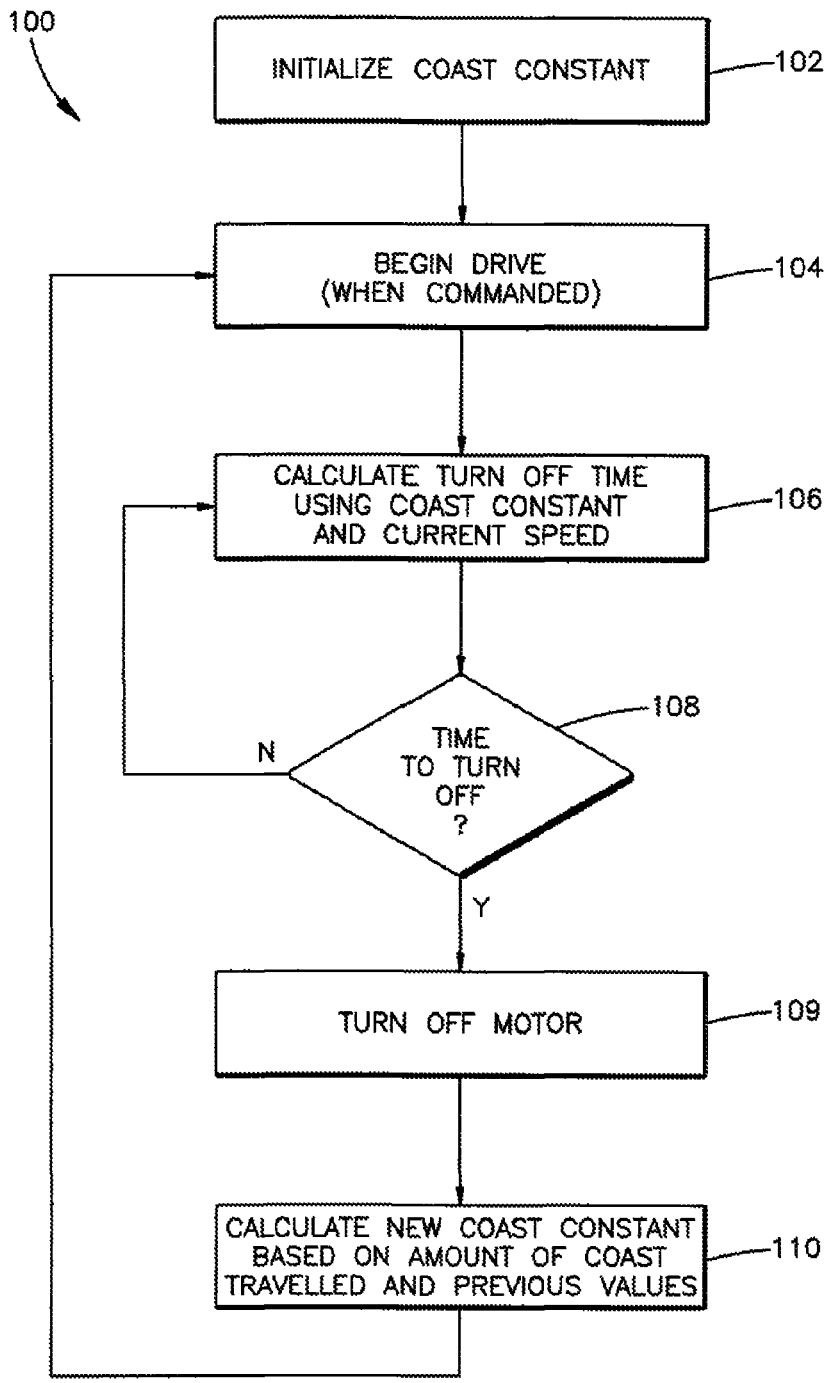
FIG. 2 is a flow diagram of the precision motor stop control process in accordance with one example embodiment of the present invention.

Referring to FIG. 2, a control process 100, in accordance with one example embodiment of the present invention, is shown for controlling the position of an electric motor. In step 102, the system is initialized, memories cleared, flags set to initial conditions, etc. In step 104, the drive command is given to the motors 22, 24 based on initial inputs. In step 106, a turn off time is calculated using a coast constant and current speed value so as to have the motor stop with the brushes midway on a contact segment. In step 108, a determination is made as to whether it is time to turn off the drive command. If the determination is negative, the process loops back to step 106. If the determination is positive, the process proceeds to step 109 where the motor is turned off in accordance with the calculated turn off time in step 106. After the motor is turned off, the process proceeds to step 110 where a new coast constant is determined based on the coast traveled and previous determined values. From step 110, the process loops back to step 104 and the process then repeats.

From the above description of the invention, those skilled in the art will perceive improvements, changes and modifications. Such improvements, changes and modifications within the skill of the art are intended to be covered by the appended claims.

Having described the invention, the following is claimed:

1. A method of controlling a position of an electric dc brush motor comprising the steps of:
   (a) supplying drive current to drive the electric motor;
   (b) calculating a coast constant for the motor;
   (c) monitoring current through the motor;
   (d) determining motor speed in response to monitored motor current; and
   (e) interrupting the electrical current to the motor in response to the calculated coast constant, and the determined motor speed when it is desired to stop the electric motor so that a brush of the motor will come to rest at a location on a commutator segment of the motor.

2. The method of claim 1 furthering comprising the steps of determining an initial motor position, counting pulses of the monitored motor current, and determining motor position in response to the counted pulses.

3. The method of claim 1 wherein said motor is connected to vehicle air diverter doors and wherein said method further includes the step of supplying drive current to the electric motor so as to position the air diverter doors to a desired position.

4. A method of controlling a position of an electric motor that includes a rotatable motor shaft and that provides signals indicative of the angular position of the motor shaft, said method comprising the steps of:
   (a) determining inductance, electrical resistance, moment of inertia, and electromotive force constant of the motor;
   (b) operating the motor to rotate the motor shaft;
   (c) measuring electrical current applied to the motor and rotational speed of the motor shaft;

(d) calculating an angular distance through which the motor shaft will coast after the electrical current is interrupted based on the determined inductance, electrical resistance, moment of inertia, and electromotive force constant of the motor and the measured electrical current applied to the motor and rotational speed of the motor shaft; and (e) interrupting the electrical current at a time based on the calculated angular distance so that a brush of the motor will rest at a location on a commutator segment of the motor and spaced from edges of the commutator segment when the motor shaft stops rotating.

5. An apparatus for controlling a position of an electric dc brush motor comprising:

an electrical supply source for supplying drive current to drive the electric motor;

means for calculating a coast constant for the motor;

a current monitor for monitoring current through the motor;

means for determining motor speed in response to monitored motor current; and an interrupter for interrupting the electrical current to the motor in response to the calculated coast constant, and the determined motor speed when it is desired to stop the electric motor so that a brush of the motor will come to rest at a location on a commutator segment of the motor.

* * * * *